United States Patent [19]

Lauchenauer

[11] 3,922,418

[45] Nov. 25, 1975

[54] HEAT-SEALABLE INTERLINING FOR TEXTILE FABRICS

[75] Inventor: Alfred E. Lauchenauer, Horn, Switzerland

[73] Assignee: Raduner and Co., AG, Horn, Switzerland

[22] Filed: July 2, 1973

[21] Appl. No.: 375,382

Related U.S. Application Data

[63] Continuation-in-part of Ser. No. 82,124, Oct. 19, 1970, abandoned, which is a continuation-in-part of Ser. No. 874,041, Nov. 4, 1969, abandoned.

[52] U.S. Cl. ............... 428/196; 156/283; 428/198; 428/200; 427/197; 427/207
[51] Int. Cl. .............................................. B32b 7/14
[58] Field of Search ....... 161/88, 89, 148, 146, 227, 161/DIG. 1, 190, 257; 260/25; 117/122 H, 76 A, 21, 25, 26, 27, 37 R, 62, 100 R, 100 B; 156/276, 283

[56] References Cited
UNITED STATES PATENTS

| | | | |
|---|---|---|---|
| 3,228,790 | 1/1966 | Sexsmith | 117/138.8 |
| 3,446,658 | 5/1969 | Rose | 161/148 |
| 3,595,739 | 7/1971 | Meyer | 161/229 |

*Primary Examiner*—Marion E. McCamish
*Attorney, Agent, or Firm*—Howson and Howson

[57] ABSTRACT

A heat-sealable textile sheet material suitable for use as an interlining for garments is prepared by applying to textile sheet material a coating of thermoplastic resin particles which do not undergo self-crosslinking at elevated temperatures, but which are crosslinkable at such temperatures by means of cross-linking agents. A crosslinking agent for the resin is included in the coating and is in contact with the resin particles only at their surfaces. The amount of crosslinking agent in the coating is insufficient to crosslink more than about 40 percent of the resin. Upon heating the sheet material bearing the coating of resin particles to elevated temperatures, only a portion of the resin particles is crosslinked. The heat-sealable interlining after being plied with a textile fabric and subjected to resin-crosslinking temperatures produces a textile laminate capable of withstanding repeated laundering and dry cleaning operations without resin strike-through or strike-back.

21 Claims, No Drawings

HEAT-SEALABLE INTERLINING FOR TEXTILE FABRICS

This application is a continuation-in-part of application Ser. No. 82,124 filed Oct. 19, 1970, now abandoned, which application in turn is a continuation-in-part of application Ser. No. 874,041 filed Nov. 4, 1969, now abandoned.

For more than twenty years shape-retaining interliners for cuffs and collars have been prepared by applying thermoplastic resins, such as polyethylene, to textile sheet material. The coated material then is cut to pieces of the desired size and shape and fused to a piece of outer fabric and the resulting laminate is formed into collars and cuffs.

With the advent of the use of lighter weight fabrics and fabrics containing synthetic fibers in the manufacture of shirts and like garments, it was found that such thermoplastic coatings had severe disadvantages, making them unfit for many uses.

More specifically, in order for a thermoplastic resin to be suitable for use as a coating on interlining material, it must have a softening point below the temperature at which degradation of the sheet material to which it is applied takes place. On the other hand, the thermoplastic resin must have a softening point above about 100°C. in order to withstand the rigors of laundering. In view of these limitations, there exists the problem that during ordinary laundering and pressing of garments in commercial launderies or even at home, the thermoplastic resin will be exposed to temperatures sufficiently high to cause it to strike-through the surface of the outer layer of fabric and produce an unsightly appearance. Strike-back, a phenomena whereby the resin flows back through the interlining, may also take place.

According to British Patent Specification No. 1,262,157, iron-on interlinings can be produced by applying a crosslinkable thermoplastic latex to a surface of a textile substrate. The interliner can be laminated to another textile fabric by hot pressing, during which the resin is completely crosslinked. Although such completely crosslinked resinous layer is not subject to strike-through, it is relatively brittle and may be subject to delamination during laundering or dry cleaning. In addition, because the resinous layer has little or no flow properties at elevated temperatures, any such delamination cannot be repaired by hot pressing.

Similarly, U.S. Pat. No. 3,595,739 discloses heat-sealable labels for marking textile articles having a heat-curing film-forming resinous layer which is substantially completely crosslinked when the labels are bonded to the textile article by hot pressing.

U.S. Pat. No. 3,228,790 discloses a binder for non-woven fabrics comprising a mixture of self-crosslinkable and non-crosslinkable thermoplastic resin latices. Upon heating of the fabrics to set the binder, the self-crosslinkable resin is substantially completely crosslinked.

An object to this invention is a novel process for producing improved heat-sealable interlinings for collars, cuffs and other form-retentive portions of garments.

Another object of this invention is an improved interlining material for form-retentive portions of garments, which interlining material does not suffer from the deficiencies of resin coated fabrics heretofore used as interlining for garments and the like.

A further object of this invention is to provide interlined textile fabrics capable of withstanding repeated laundering and dry cleaning operations without strike-through or strikeback, wherein the resinous binder has sufficient residual thermoplasticity to enable fabric repairs.

These and other objects will become further apparent from a consideration of this specification and appended claims.

According to this invention there is provided a novel process for producing a heat-sealable textile sheet material, particularly suitable for use as an interlining for garments and the like, which comprises applying to a textile sheet material a coating consisting essentially of discrete solid particles of a thermoplastic resin having a softening point between about 50° and 200°C., a Melt Flow Index of from about 20 to 50, and which upon being heated to a temperature of from about 50°C. does not undergo self-crosslinking, but at such temperature is capable of being crosslinked by means of a crosslinking agent. The resin particles forming the coating have an average particle size of from about 2 to 300 microns. The coating also includes a crosslinking agent for the resin, the crosslinking agent being in contact only with the surface of the resin particles at the time of application of the coating and being present in an amount sufficient to crosslink not more than about 40 percent, by weight, of the resin. After being heated to the crosslinking temperature, the resin particles have an average Melt Flow Index not greater than about 10.

Preferably, the coating is discontinuous, e.g. is in the form of a pattern of substantially uniformly spaced dots, and comprises resin particles having an average particle size of from about 10 to 60 microns. Particularly preferred crosslinkable thermoplastic resins are of the polyamide type, such as terpolymers derived from nylon 6, nylon 6,6 and nylon 12 monomers which, when subjected to hot pressing, are partially crosslinked by such crosslinking agents as an ethylene glycol acetal of formaldehyde or a masked di- or poly- isocyanate.

It was discovered that by use of crosslinkable thermoplastic resins, more fully described hereinafter, an improved interlining material which is not subject to the deficiencies of prior known interliners can be obtained. Advantageously, the thermoplastic resins have a softening point, Melt Flow Index, and other physical properties making them readily appliable to a textile sheet material under conditions which present no problem of degradation of the fibers forming the textile sheet material. In addition, and of particular significance, is the fact that after the interlining is heat-sealed or fused to a face fabric, i.e., the thermoplastic resin is partially crosslinked, the resin particles have a relatively low Melt Flow Index on the order of 10 or less. Thus, the resin in its partially crosslinked state is not subject to strike-through or strike-back when the garment in which the novel interlining is used is subjected to laundering, pressing, etc. In addition, the resinous coating of the interlining has sufficient residual thermoplasticity after crosslinking to enable the interlining to be subsequently rebonded to a textile fabric to make repairs.

The textile sheet material to which the thermoplastic resin coating may be applied may consist of natural fibers such as cotton or animal fibers, or regenerated cellulose fibers, or of fibers of such synthetic resins as polyamides, polyesters, polyacrylonitriles, polyurethanes, polyolefins, etc., including blends of such fibers. In the case of synthetic fibers, preferably they have a softening point at least 20°C. above the softening point of the thermoplastic resin to be applied thereto. With most thermoplastic resins suitable for use in the present invention, synthetic fibers having a softening point on the order of about 180°C. or somewhat greater are quite satisfactory. The textile sheet material may be a woven or knitted fabric, or a non-woven fabric.

Preferably the textile sheet material is given a preliminary treatment which imparts some degree of dimensional stability thereto prior to application of the coating of thermoplastic resin. Such treatment may involve heat-setting of thermoplastic fibers and crosslinking of cellulose fibers.

The dimensional stabilization of cellulose fibers advantageously can be carried out using the process described in U.S. Pat. No. 3,533,726.

The heat-sealable coating composition utilized in this invention consists essentially of discrete solid particles of a thermoplastic resin having a softening point between about 50° and 200°C. Such resins are substantially linear polymers or copolymers of relatively low melting range and are truely thermoplastic, i.e., they melt and flow on heating, and are highly swellable or soluble in ordinary solvents for such polymers.

The thermoplastic resins should have a Melt Flow Index of from about 20 to about 50 when applied to the textile sheet material substrate. By Melt Flow Index, as used in this specification and claims, is meant the weight, in grams, of molten polymer at a given temperature which is caused to flow through an orifice of standardized diameter under a standardized pressure in a given time, using conditions D, E, H and K of Table I of ASTM Designation: D 1238-57T issued, 1952; revised 1957, and entitled "Measuring Flow Rates of Thermoplastics by Extrusion Plastometer". In determining Melt Flow Index according to this invention, the same test conditions should be used before and after crosslinking.

The resin particles of the heat-sealable coating are nonself-crosslinkable, i.e., they do not have incorporated in the polymer chain reactive groups which may be crosslinked directly with reactive groups present in other polymer chains of the resin upon the application of heat. However, the resins are crosslinkable by means of crosslinking agents when heated to elevated temperatures in the range between about 50° and 200°C.

The resin particles are relatively large and should have an average particle size of from about 2 to 300 microns, preferably from 10 to 60 microns.

Crosslinkable thermoplastic resins which may be used in the process of this invention fall into several well-known polymer classes, namely, polyamides, polyolefins, polyacrylates, polyesters, polyesteramides, polyvinylic, polyurethane, and cellulose esters.

The thermoplastic polyamides contain a plurality of amido -NR-CO- groups in the main polymer chain separated by alkylene groups of varying chain length, and/or arylene groups. Examples of polyamides suitable for use in the heat-sealable coatings of this invention are copolyamides of nylon 6 and nylon 6,6; nylon 6 and nylon 6,10; nylon 6 and nylon 12; and terpolyamides such as nylon 6, nylon 6,6 and nylon 12; nylon 6, nylon 6,6 and nylon 11; hexamethylene isophthalamide, hexamethylene terephthalamide and hexamethylene adipamide terepolymers, and plasticized mixtures of such polyamides. These polyamides, prior to being crosslinked, swell strongly in such organic solvents as cold isopyopyl alcohol and butanol. They are soluble in formic acid and in hot methanol and ethanol.

The polyamides may be crosslinked by means of low molecular weight aldehydes, such as formaldehyde, acrolein and glyoxal, by polymethylol compounds, by di- and poly-isocyanates which preferably are masked, e.g., amidimides and adiponitrile carbonate, by dihalogeno compounds, by epoxy compounds, by by adiponitrile carbonate, by aliphatic and aromatic aminimides, and by polycarbodiamides.

The polyolefins which may be used include such well-known thermoplastic resins as polyethylene, polypropylene and polybutylene, and olefin copolymers with vinyl acetate, vinyl chloride, acrylamide, acrylic and other acids having olefinic unsaturation, acrylic esters, butadiene, isopreme and various combinations of the above monomers. Prior to crosslinking these polymers generally swell in such organic solvents as cold toluene, xylene and benzene, cold perchloroethylene and trichloroethylene, and cold ethyl acetate. The polymers are soluble in such organic solvents as hot toluene and xylene, and hot perchloroethylene and trichloroethylene.

Crosslinking agents for polyolefins include compounds decomposing at elevated temperatures to generate reactive free radicals, such as dicumyl peroxide, benzoyl peroxide, lauoryl peroxide, cumene hydroperoxide, t-butyl benzoyl peroxide and azobisisobutyronitrile. Where olefin copolymers are employed, appropriate crosslinking agents depend upon the particular comonomer present. Typical crosslinking agents for various comonomers are shown in the following table:

TABLE I

| Comonomer | Crosslinking Agent |
| --- | --- |
| vinyl chloride | aromatic amine |
| vinyl acetate | aromatic amine |
| acrylamide | formaldehyde |
| carboxamide | di-isocyanates, formaldehyde and N-methylol compounds |
| acrylic acid | polyols, e.g. ethylene glycol, polyvalent cations, amines |

Vinylic resins which may be used in the coatings include polymers and copolymers of vinyl chloride and vinyl acetate with small amounts of such comonomers as acrylamide, methacrylamide, acrylic acid, etc. These vinylic resins may be crosslinked by such compounds as formaldehyde, polyfunctional epoxides, methylol compounds, etc.

The crosslinkable polyacrylates which may be used are essentially linear polymers and copolymers of acrylic acid esters which contain functional groups, as, for example, hydroxy, amino, aminoamido, and vinylic groups, which may be crosslinked by well known crosslinking agents. Before crosslinking, these crosslinkable polyacrylates swell strongly in such swelling agents as hot toluene, hot ethyl acetate and dimethylformamide. They are soluble in such solvents as cold ethyl acetate, cold trichloroethylene and cold perchloroethylene. After crosslinking, the polymers are no longer soluble in such solvents.

Suitable crosslinking agents for the polyacrylates are aldehydes such as formaldehyde and compounds capable of decomposing to aldehydes; di- and poly-isocyanates, particularly aliphatic di-isocyanates, and epoxides.

Crosslinking of polyacrylates containing hydroxy and/or amido groups by means of aldehydes may be catalyzed by means of inorganic or organic acids, lewis acids, metal salts such as magnesium and zinc halides and nitrates, metal salts of fluoboric and silicofluoric acid, and ammonium salts of strong inorganic acids. Where the crosslinking agent is a di-isocyanate, an amine catalyst may be utilized.

Other thermoplastic resins which may be used in the coatings of the heat-sealable textile sheet materials of this invention include polyesters, such as those derived from polyhydric alcohols, such as ethylene and butylene glycol, and glycerol, aminoalcohols, and dibasic acids such as adipic and itaconic acid, and dimer acid, and epoxidized carboxylic acids, polyesteramides, etc. The polyesters should contain a substantial number of crosslinkable groups.

Crosslinking agents for the polyesters include trifunctional acids, amines, polyols, di-isocyanates, bisazodicarboxylates, formaldehyde and N-methylol compounds.

The polyesteramides may be crosslinked by the same crosslinking agents as are usable with the polyesters or polyamides.

Other resins include cellulose esters such as cellulose acetate and cellulose acetate butyrate which may be crosslinked by such compounds as formaldehyde, melamine-formaldehyde, N-methylol compounds, methylolbenzoguanamine and epoxides.

At the time of application of the coating of solid particles of thermoplastic resin to the textile sheet material substrate, the resin particles and crosslinking agent comprise separate phases, the crosslinking agent being in contact with the resin particles only at the surface of the particles. This relationship of resin particles and crosslinking agent is an important feature of this invention for it is through such relationship that the controlled degree of crosslinking that is sought is in fact obtained. A coating providing separate phases of resin particles and crosslinking agent can be obtained by the use of powders, pastes, and the like. For example, a powder consisting of a mixture of solid particles of resin and solid particles of crosslinking agent can be prepared in suitable solids mixing apparatus and applied to the textile sheet material. On the other hand, the coating can be applied in the form of a paste. In the case of a paste, the liquid phase should be a material, such as water, in which the solid resin particles are substantially insoluble. However, the crosslinking agent may or may not be soluble in the liquid portion of the paste. The crosslinking agent could also be encapsulated in thermoplastic material which ruptures to release the agent under heatsealing conditions of temperature and pressure. Whether the coating is applied as a paste or powder, it can be seen that at the time of application, the crosslinking agent will be in relatively limited contact with the resin particles, namely, with all or only portions of the surface of the resin particles.

The amount of crosslinking agent employed in the coatings should be capable of causing crosslinking of not more than about 40 percent, by weight of the resin. Preferably, the quantity of crosslinking agent provides for the crosslinking of from about 10 to about 20 percent of the resin.

In the case of pastes, the proportions of constituents should be such as to provide the paste with the necessary flow properties for ready application to the textile substrate. The liquid phase may comprise various materials in addition to water, e.g. organic liquids such as esters, hydrocarbons and chlorinated hydrocarbons in which the resin particles are substantially insoluble, but in which the crosslinking agent may or may not be soluble, as desired. Pastes having the desired flow properties may comprise from about 5 to about 45 percent, of resin particles, and from about 55 to about 95 percent of liquid phase, based on the total weight of the composition. The composition should also contain from about 0.5 to about 15 percent of crosslinking agent, based on the weight of the resin.

The coating compositions may contain plasticizers, pigments, softeners, hydrophobing agents, and agents capable of reacting with the fibers of the sheet material to which the polymer composition is applied.

In the case of plasticizers, they may be present in amounts up to 50 percent by weight of resin. Plasticizers which are particularly suitable for plasticizing polyvinyl chloride are esters of phthalic acid, e.g., dioctyl phthalate, as well as linear esters of di- or polyoxy compounds. Suitable plasticizers for cellulose esters are dimethyl, diethyl and dibutyl phthalate. The polyamides may be plasticized by means of alkyl aryl sulfonamides, such as p-toluene sulfonamide, and by polyhydroxy compounds such as actatriol.

Pigments may be present in amounts up to about 10% by weight of resin. Typical inorganic pigments are clay, chalk, oxides of magnesium, calcium and aluminum, and colored salts of chromium, copper, etc. Organic pigments may be white or colored, or may act as fluorescent brighteners.

The coating compositions may be applied to textile sheet material in various ways. Powders can be uniformly applied through screens or the like. Pastes can be applied by means of a doctor blade, or roller coated. Preferably, the pastes are printed onto the textile substrate in such manner as to provide a discontinuous coating, as for example a pattern of regularly spaced dots. Suitable apparatus for providing such a discontinuous coating include printing rollers and screens, etc. In a discontinuous coating, the areas where the coating is not applied should not be so great as to provide inadequate bonding between the interlining and the textile fabric it is intended to reinforce.

The amount of coating applied to the textile substrate will vary depending upon the use for which the resulting heatsealable products is designed. Where the heat-sealable sheet material is designed for use as an interliner for wearing apparel, application of the coating is an amount of from about 5 to about 60 g. per square meter is generally adequate. Expressed in different terms the thickness of the coating generally should not exceed about one-half the thickness of the textile sheet material to which it is applied.

After the resin coating is applied to a textile sheet material, any heat treatment preceding the heat-sealing step should be carried out under conditions with respect to temperature and duration of heating so as to avoid any substantial crosslinking of the resin. This applies for instance to drying steps which are necessary if the coating is applied in the form of a paste, and also to any subsequent calendering treatments carried out to flatten or smooth the coating.

Heat-sealing, or crosslinking of thermoplastic resin is accomplished by heating the resin and crosslinking agent, preferably in the presence of a crosslinking catalyst, to a temperature in the range between about 50° and 200°C., preferably 120°–180°C., for a short period of time. Ordinarily, the heatsealable textile sheet material will be combined with a textile fabric to which it is to be heat-sealed.

During the heat-sealing operation, not all of the thermoplastic resin is crosslinked. Rather, not more than about 40 percent, and preferably 25 percent, by weight, of the resin is crosslinked by reason of the amount of crosslinking agent employed and the limited contact between resin and crosslinking agent. The resin coating after crosslinking, therefore, has substantial thermoplasticity enabling the heat-sealable textile sheet material to be resealed to the textile fabric which it is intended to reinforce should the layers become separated in use. However, the crosslinked coating has a substantially reduced Melt Flow Index, e.g., a Melt Flow Index not greater than about 10, and preferably of about 2 to 6, whereby it can withstand repeated laundering and dry cleaning without strike-through or strike-back.

The subject matter of this invention is demonstrated but not limited by the following examples.

EXAMPLE 1

A paste having the following composition was prepared:

| Constituent | Parts by Weight |
| --- | --- |
| Terpolyamide* | 25 |
| Thickener (2% solids) | 25 |
| Crosslinking agent** | 8 |
| Zinc nitrate catalyst | 1.25 |
| p-toluene sulfonamide | 5 |
| Water | 25 |

*Terpolymer of nylon 6, nylon 6,6 and nylon 12
**Ethylene glycol acetal of formaldehyde.

The paste was applied to a fabric and dried at 100°C. The resulting interlining was heat-sealed to a polyester/cotton fabric (65%/35%) at a temperature of 180°C. for 40 seconds. Prior to heat-sealing, the crosslinking agent was present only on the surface of the resin particles. The fusing treatment caused deformation of the resin particles permitting limited penetration of the crosslinking agent into the resin resulting in only partial crosslinking of the resin. The resulting laminate had improved resistance to laundering at elevated temperatures.

EXAMPLE 2

A mixture of 90 parts by weight of the polyamide terpolymer powder mentioned in Example 1 was thoroughly mixed with 10 parts of a masked isocyanate powder (Desmodur L 75 powder), and then applied to the cotton fabric described in Example 1 by dusting, the add-on being 25 g/m². To anchor the particles on the fabrics, the material was sintered by subjecting the fabric to a heat-treatment at 130°C. for 30 seconds in the absence of pressure. The fabric was then fused to a cotton broad cloth under a pressure of 300 g/m² at 100°C. for 40 seconds to produce Sample 1. In the fusing step the crosslinking agent and polymer are brought into contact by pressure and deformation of the resin particles by the fabric structure.

As a control sample, the same ter-polymer polyamide, but without the masked isocyanate powder, was dusted on to the same cotton fabric, sintered and fused under identical conditions to produce Control Sample 1A.

The same polyamide powder with the same masked isocyanate was dispersed in water (30 percent solids), with thickener added to produce a printable paste. This paste was then printed on the same fabric described above in the form of dots, the total addon being 27 g/m², dried at 100°C., and fused to the same cotton fabric mentioned above under same conditions to produce Sample 2.

The same paste was prepared, leaving out, however, the masked isocyanate. It was then applied to the same fabric and fused to another fabric as described above to produce Control Sample 2A.

WASHING TESTS

Samples 1 and 2, and Control Samples 1A and 2A, were subjected to machine laundering at 60°C. and at the boil. The peel strength after laundering and drying was determined in the usual way.

TABLE II

| Sample No. | Peel Strength After Laundering at 60°C. | Peel Strength After Laundering at the Boil |
| --- | --- | --- |
| 1 | 1500 g | 500 g |
| 1A | 1200 g | delaminated |
| 2 | 2000 g | 1500 g |
| 2A | 1800 g | delaminated |

EXAMPLE 3

To 100 parts of a non-crosslinkable aqueous dispersion of ethyl and butyl acrylate (50 percent solids binder), 50 parts of a linear polyamide (nylon 6,6) powder (particle size 0.1 to 0.3 millimeters) were added 10 parts of paraformaldehyde (crosslinking agent for polyamide) and 7.5 parts of oxalic acid (solid oxalic acid content 40 percent) encapsulated in styrene-butadiene to prevent contact between oxalic acid as crosslinking catalyst, and the polyamide and paraformaldehyde until the composition is subjected to fusing, where the capsules burst and release oxalic acid. Particle size of capsules is between 0.05 and 0.15 millimeters).

This paste was printed on a cotton print cloth, which had been dimensionally stabilized by compressive shrinkage ("Sanforizing"), in the form of dots 2mm distant from each other. Drying was effected at 90°C. Dry weight of material in dots 20 grams per square meter.

When fused in garment presses to various apparel fabrics, the initial bond strength was found to be virtually identical to that obtained with the same polyamide dots not crosslinked. Peel strength after repeated machine launderings at temperatures exceeding 60°C. was, however, considerably higher for the crosslinked polyamide, as set forth in Table III, below.

TABLE III

| | Crosslinked polyamide | Uncrosslinked polyamide | Number of samples laundered |
| --- | --- | --- | --- |
| Failures* after 1 laundering at 95°C. | 0 | 2 | 10 |

*Failure: complete delamination during laundering cycle.

What is claimed is:

1. A process for producing a heat-sealable textile sheet material, particularly suitable for use as an interlining for garments, which comprises applying to a textile sheet material a coating consisting essentially of (1) discrete solid particles of a thermoplastic resin having a softening point between about 50° and 200°C, a Melt Flow Index of from about 20 to 50, and which upon being heated to a temperature of from about 50°C. to 200°C. does not undergo self-crosslinking but at such temperature is capable of being crosslinked by means of a crosslinking agent, said resin particles having an average particle size of from about 2 to 300 microns, and (2) a crosslinking agent for said resin, said crosslinking agent being in contact only with the surface of said resin particles and being present in an amount sufficient to crosslink not more than about 40 percent, by weight of said resin, said resin particles after being heated to said crosslinking temperature having an average Melt Flow Index not greater than about 10.

2. The process according to claim 1 in which said coating is in the form of a paste having a liquid phase in which said resin particles are substantially insoluble.

3. The process according to claim 2 in which said crosslinking agent is soluble in said liquid phase.

4. The process according to claim 3 in which said paste consists essentially of polyamide resin particles in an aqueous liquid phase.

5. The process according to claim 1 in which said coating is in the form of a powder consisting essentially of a mixture of solid particles of resin and crosslinking agent.

6. The process according to claim 5 in which said powder consists essentially of a mixture of polyamide resin and masked isocyanate particles.

7. The process according to claim 1 in which said coating is discontinuous and comprises a pattern of substantially uniformly spaced dots.

8. A heat-sealable textile sheet material, particularly suitable as an interliner for garments comprising a textile sheet material having on a surface thereof a coating consisting essentially of (1) discrete solid particles of a thermoplastic resin having a softening point between about 50° and 200°C., a Melt Flow Index of from about 20 to 50, and which upon being heated to a temperature of from about 50°C. to 200°C. does not undergo self-crosslinking but at such temperature is capable of being crosslinked by means of a crosslinking agent, said resin particles having an average particle size of from about 2 to 300 microns, and (2) a crosslinking agent for said resin, said crosslinking agent being in contact only with the surface of said resin particles and being present in an amount sufficient to crosslink not more than about 40 percent by weight, of said resin, said resin particles after being heated to said crosslinking temperature having an average Melt Flow Index not greater than about 10.

9. Heat-sealable textile sheet material according to claim 8 in which said resin particles are coated with crosslinking agent.

10. Heat-sealable textile sheet material according to claim 9 in which said resin particles comprise a polyamide and said crosslinking agent comprises an ethylene glycol acetal of formaldehyde.

11. Heat-sealable textile sheet material according to claim 9 in which said coating is discontinuous and comprises a pattern of substantially uniformly spaced dots.

12. Heat-sealable textile sheet material according to claim 8 in which said coating is in the form of a powder consisting essentially of a mixture of solid particles of resin and crosslinking agent.

13. Heat-sealable textile sheet material according to claim 10 in which said resin particles comprise a polyamide and said crosslinking agent comprises a masked isocyanate.

14. A process for making a textile laminate which comprises placing a textile fabric against the surface of an interliner having a heat-sealable coating, said coating consisting essentially of (1) discrete solid particles of a thermoplastic resin having a softening point between about 50° and 200°C., a Melt Flow Index of from about 20 to 50, and which upon being heated to a temperature of from about 50°C. to 200°C. does not undergo self-crosslinking but at such temperature is capable of being crosslinked by means of a crosslinking agent, said resin particles having an average particle size of from about 2 to 300 microns, and (2) a crosslinking agent for said resin, said crosslinking agent being in contact only with the surface of said resin particles and being present in an amount sufficient to crosslink not more than about 40 percent, by weight, of said resin, said resin particles after being heated to said crosslinking temperature having an average Melt Flow Index not greater than about 10, and pressing the resulting assembly at a temperature of from about 50° to 200°C. to crosslink a portion of said resin, and to bond together said textile fabric and interliner.

15. The process according to claim 14 in which said resin particles forming said heat-sealable coating are coated with crosslinking agent.

16. The process according to claim 14 in which said heatsealable coating is in the form of a powder consisting essentially of a mixture of solid particles of resin and crosslinking agent.

17. The process according to claim 14 in which said heatsealable coating is discontinuous and comprises a pattern of substantially uniformly spaced dots.

18. The process according to claim 14 in which said resin particles comprise a polyamide and said crosslinking agent comprises an ethylene glycol acetal of formaldehyde.

19. The process according to claim 14 in which said resin particles comprise a polyamide and said crosslinking agent comprises a masked isocyanate.

20. A textile laminate comprising a textile fabric bonded to an interliner by means of a layer of resinous composition consisting essentially of a partially crosslinked thermoplastic resin derived from (1) discrete solid particles of a thermoplastic resin having a softening point between about 50° and 200°C., a Melt Flow Index of from about 20 to 50, and which upon being heated to a temperature of from about 50°C. to 200°C. does not undergo self-crosslinking but at such temperature is capable of being crosslinked by means of a crosslinking agent, said resin particles having an average particle size of from about 2 to 300 microns, and (2) a crosslinking agent for said resin, said crosslinking agent being in contact only with the surface of said resin particles and being present in an amount sufficient to crosslink not more than about 40 percent, by weight, of said resin, said resinous composition, after being heated to said crosslinking temperature, having a Melt Index not greater than about 10.

21. A textile laminate according to claim 20 in which said resinous composition consists essentially of a partially crosslinked polyamide resin.

* * * * *